Apr. 17, 1923.
T. E. PRAY
LOCOMOTIVE
Filed July 31, 1922
1,451,889
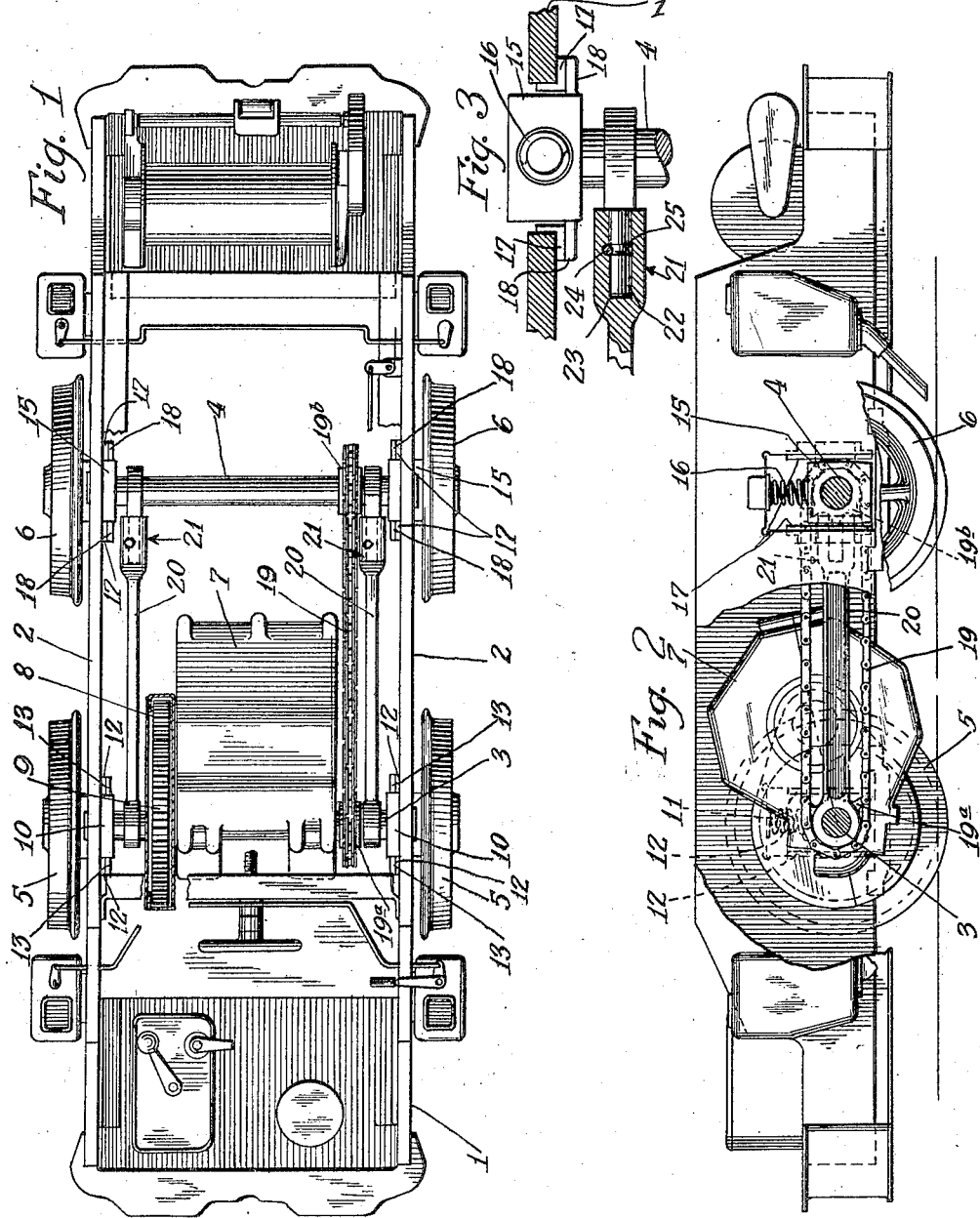
Inventor;
Thomas E. Pray
By Clarence F. Poole
Attorney Patented Apr. 17, 1923.

1,451,389

UNITED STATES PATENT OFFICE.

THOMAS E. PRAY, OF CHICAGO, ILLINOIS, ASSIGNOR TO GOODMAN MANUFACTURING COMPANY, OF CHICAGO, ILLINOIS, A CORPORATION OF ILLINOIS.

LOCOMOTIVE.

Application filed July 31, 1922. Serial No. 578,576.

*To all whom it may concern:*

Be it known that I, THOMAS E. PRAY, a citizen of the United States, residing at Chicago, in the county of Cook and State of Illinois, have invented an Improvement in Locomotives, of which the following is a specification.

This invention relates to improvements in locomotives and more particularly to locomotives having a plurality of axles operatively connected together by a driving chain and has for its principal object to provide an improved construction of locomotives of the class described.

The invention may best be understood by reference to the accompanying drawing in which—

Figure 1 is a top plan view of a locomotive constructed in accordance with my invention.

Fig. 2 is a side view of the locomotive with a portion thereof broken away.

Fig. 3 is a detail showing a portion of a radius rod.

In the drawing, a locomotive of the mining type is used to illustrate my invention and comprises a frame 1 having side plates 2, 2, and axles 3 and 4, each provided with supporting wheels 5, 5, and 6, 6, of the usual construction. A motor 7 is supported in the usual manner on one of the axles 3 and has driving connection therewith through a motor pinion 8 and a gear 9 on said axle. The axles are operatively connected together by a chain 19 and sprockets 19ª and 19ᵇ, on axles 3 and 4 respectively.

In order to maintain a uniform tension of the driving chain, a rigid spacing device is interposed between the axles, which device comprises a pair of radius rods 20, 20, connecting adjacent ends of the axles 3 and 4 respectively. Any suitable means for connecting the radius rods to the axles may be provided, as for instance, they may be journaled at opposite ends directly on the axles. In order to permit relative movement out of parallelism with each other, each of the radius rods is provided with a suitable swivel joint indicated at 21, which, in the form illustrated, comprises a spindle 22 connected with one end of the radius rod, rotatably mounted in a socket 23 on the other end of the rod. A removable pin 24 extends through said socket and engages an annular groove 25 formed about the spindle 22.

The axle 3 is journaled in axle boxes 10, 10, each having a spring 11 providing a resilient support for the frame and vertically movable between guide plates 12, 12, in the usual manner. Each of the axle boxes 10, 10, is provided with thrust plates 13, 13, adapted to bear against the inner face of the guide plates 12, 12, to prevent lateral displacement of the axle. The opposite axle 4 is provided with a pair of axle boxes 15, 15, and springs 16, 16, the axle boxes being mounted between guide plates 17, 17, on the side frame 2. Thrust members 18, 18, corresponding to the thrust members 13, 13, of axle boxes 10, 10, engage the inner surface of guide plates 17, 17, but the sides of the journal box 15 are spaced somewhat from said guide plates as shown in Fig. 2.

Owing to the clearance between the axle boxes 15, 15, and the guide plates, it will be seen that each end of the axle 4 which is connected by a radius rod 20 to the adjacent end of axle 3, as described, may be displaced vertically through a limited arc having axle 3 as a center. The axles are also free to move out of parallelism with each other by reason of the provision of the swivel joints 21, 21. The construction therefore permits relative flexibility between the axles, but maintains a uniform distance between the driving sprockets 19ª and 19ᵇ so that the tension of the chain 19 is substantially uniform in all permissible positions of the axles.

Although I have shown and described one form in which my invention may be embodied, it will be understood that many other means may be employed for accomplishing the same results, without departing from the spirit and scope of my invention. I do not therefore wish to be understood as limiting myself to the specific construction illustrated herein excepting as specifically limited in the appended claims.

I claim as my invention:

1. In a locomotive, a frame, an axle, guide means for said axle permitting vertical movement thereof respective to said frame, a second axle operatively connected to the first named axle by a chain, a spacing device adapted to maintain said axles at a substantially uniform distance from each other, spring suspension means interposed between both of said axles and said frame, and driving means connected with one of said axles.

2. In a locomotive, a frame, a pair of axles operatively connected by a chain, a spacing device adapted to maintain said axles at a substantially uniform distance from each other, spring suspension means interposed between said axles and said frame, driving means connected with one of said axles, and guide means for one of said axles permitting vertical movement thereof respective to said frame, the other of said axles being free to move in a limited arc with said first named axle as a center.

3. In a locomotive, a frame, two axles operatively connected by a chain, driving means connected with one of said axles, a spacing device connecting said axles, means on said spacing device permitting said axles to swing out of parallelism with each other, spring suspension means interposed between said axles and said frame, guide means permitting vertical movement of one of said axles respective to said frame, and means permitting movement of the other of said axles in a limited arc with said first named axle as a center.

4. In a locomotive, a frame, a pair of axles operatively connected by a chain, a radius rod adjacent said chain adapted to maintain said axles at a substantially uniform distance from each other, spring suspension means interposed between said axles and said frame, driving means connected with one of said axles, and guide means for one of said axles permitting vertical movement thereof respective to said frame, the other of said axles being free to move in a limited arc with said first named axle as a center.

5. In a locomotive, a frame, a pair of axles operatively connected by a chain, a radius rod adjacent said chain adapted to maintain said axles at a substantially uniform distance from each other, a swivel joint on said radius rod permitting said axles to swing out of parallelism with each other, spring suspension means interposed between said axles and said frame, driving means connected with one of said axles, and guide means for one of said axles permitting vertical movement thereof respective to said frame, the other of said axles being free to move in a limited arc with said first named axle as a center.

6. In a locomotive, a frame, a pair of axles operatively connected by a chain, a pair of radius rods spaced laterally from each other and adapted to maintain said axles at a substantially uniform distance from each other, spring suspension means interposed between said axles and said frame, driving means connected with one of said axles, and guide means for one of said axles permitting vertical movement thereof respective to said frame, the other of said axles being free to move in a limited arc with said first named axle as a center.

7. In a locomotive, a frame, a pair of axles operatively connected by a chain, a pair of radius rods spaced laterally from each other and adapted to maintain said axles at a substantially uniform distance from each other, each of said radius rods having a swivel joint permitting said axles to swing out of parallelism with each other, spring suspension means interposed between said axles and said frame, driving means connected with one of said axles, and guide means for one of said axles permitting vertical movement thereof respective to said frame, the other of said axles being free to move in a limited arc with said first named axle as a center.

Signed at Chicago, in the county of Cook and State of Illinois, this 28th day of July, 1922.

THOMAS E. PRAY.